March 15, 1932.  E. E. McCOLLUM  1,849,405
ELECTRIC CONTROL MECHANISM
Filed Sept. 8, 1924  3 Sheets-Sheet 1
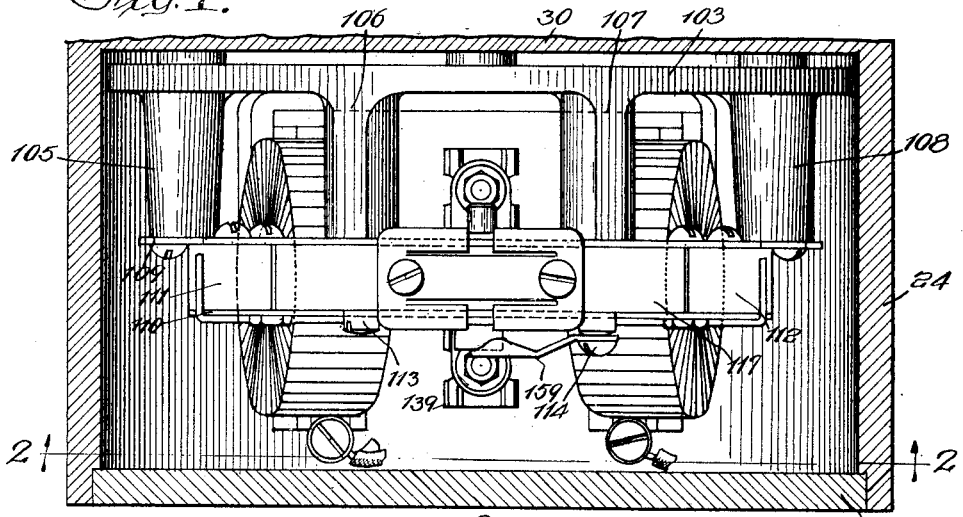
Fig. 1.
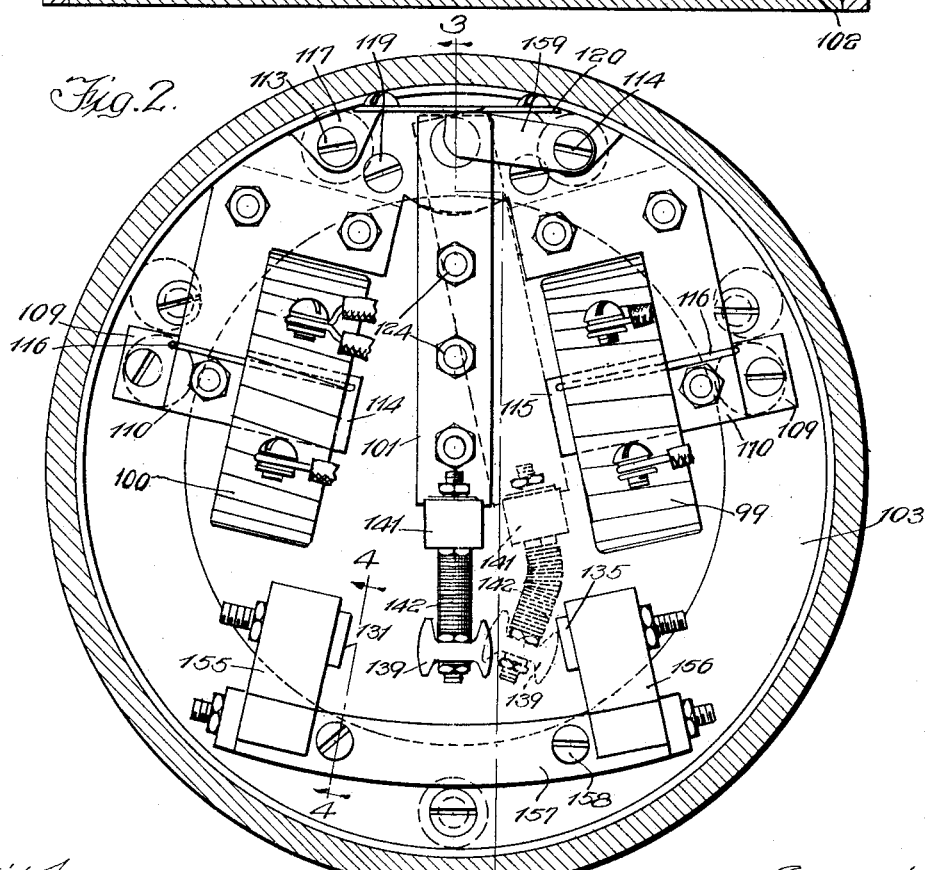
Fig. 2.
Witnesses:
W. P. Kilroy
Inventor:
Earl E. McCollum
By
Att'ys March 15, 1932.  E. E. McCOLLUM  1,849,405

ELECTRIC CONTROL MECHANISM

Filed Sept. 8, 1924  3 Sheets-Sheet 2

Witnesses:
W. F. Kilroy
Harry R. LuWhite

Inventor:
Earl E. McCollum
By Mason Bosuere Denney
Atty.

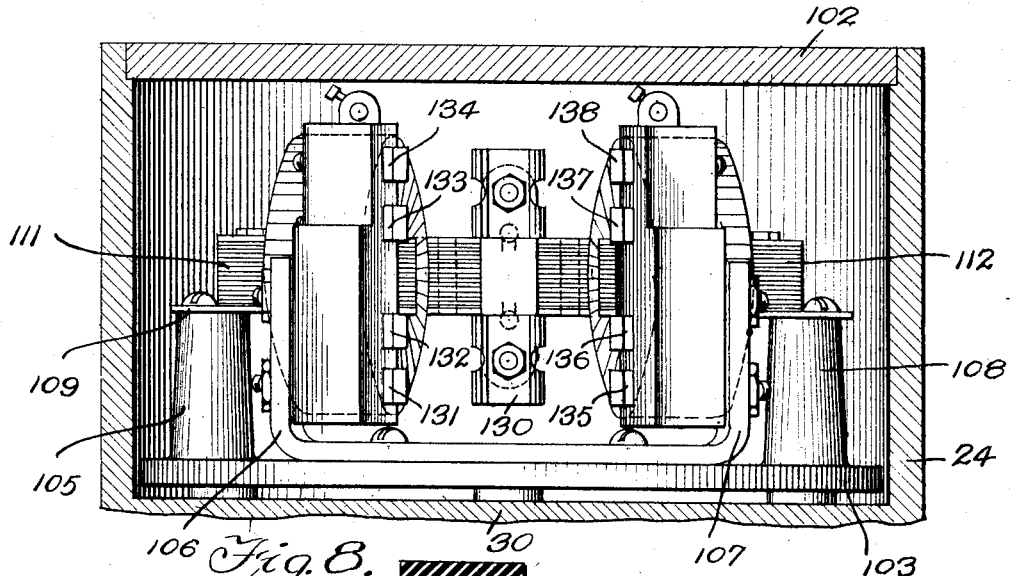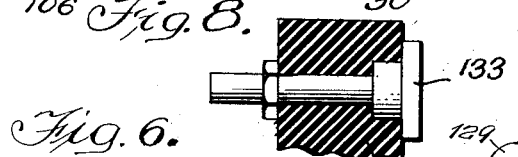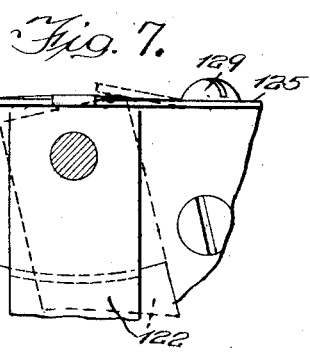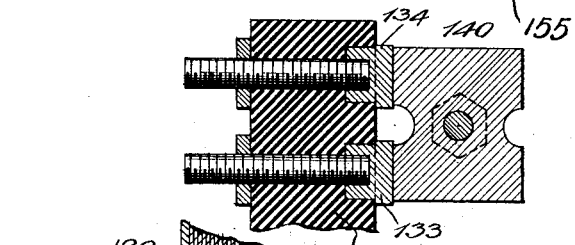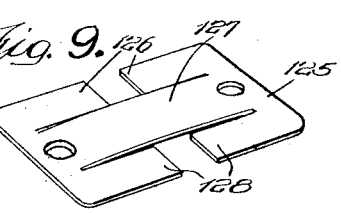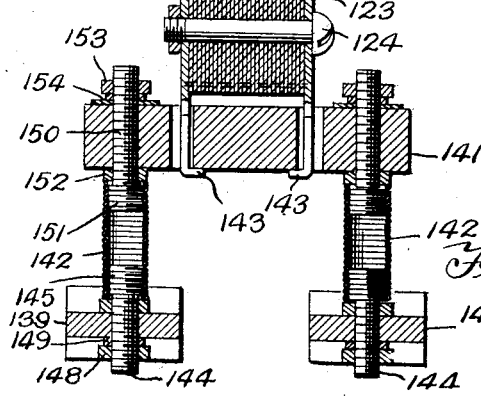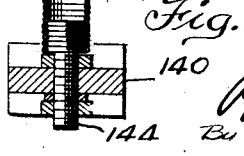

Patented Mar. 15, 1932

1,849,405

UNITED STATES PATENT OFFICE

EARL E. McCOLLUM, OF DOWNERS GROVE, ILLINOIS, ASSIGNOR, BY MESNE ASSIGNMENTS, TO McCOLLUM HOIST & MFG. CO., OF DOWNERS GROVE, ILLINOIS, A CORPORATION OF ILLINOIS

ELECTRIC CONTROL MECHANISM

Application filed September 8, 1924. Serial No. 736,450.

My invention relates to electrical control mechanism and more particularly to a controller for electric hoists.

The object of the present invention is to provide a simple and rugged control mechanism or relay for the electric circuit for starting and stopping a hoist in either raising or lowering the load. This relay solves a difficult problem of control and constitutes an improvement in devices of its class independently of its place of use. It is to be noted, however, that this relay is peculiarly applicable to a hoist because of the compact assembly which it makes possible.

There are numerous structural features which constitutes improvements which are set out in the appended claims.

In order to acquaint those skilled in the art with the method of constructing and operating a device of my invention I shall now describe in connection with the accompanying drawings that portion of a hoist involving the features above referred to, and forming a basis for the claims hereto appended. In the drawings:

Fig. 1 is a plan view of the controller with the housing shown in section;

Fig. 2 is a front elevation of the controller, the casing being shown in section, this view being taken on the line 2—2 of Fig. 1;

Fig. 5 is a bottom plan view;

Fig. 6 is a fragmentary elevational view showing the manner in which the moving contact engages the fixed contact;

Fig. 7 is a fragmentary elevational view showing the centering spring acting upon the swinging armature;

Fig. 8 is a fragmentary section showing the mounting of the individual contact;

Fig. 9 is an isometric view of the restoring spring shown in Fig. 7;

Fig. 10 is a fragmentary sectional view of the lower part of the armature and the contact support for the relay.

Figure 3:
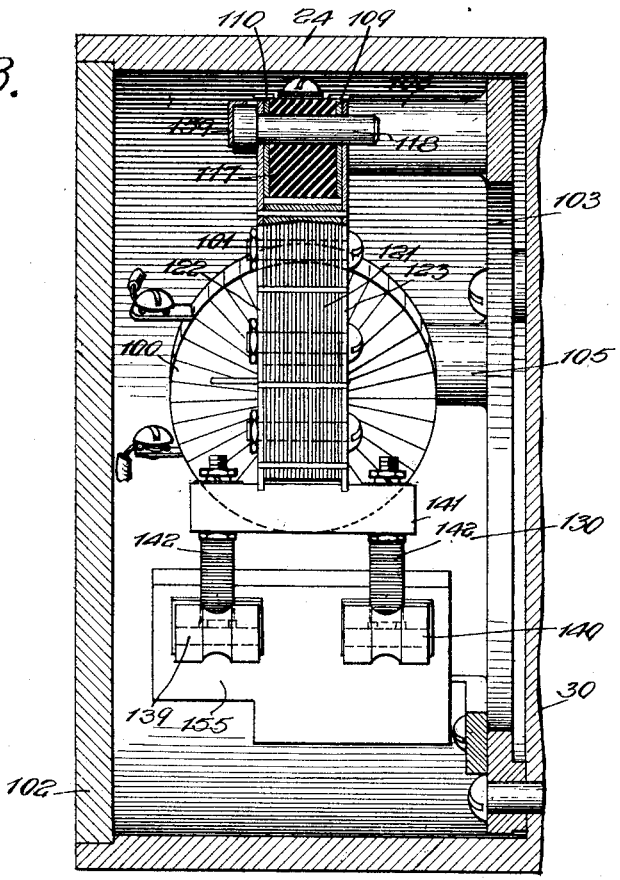
Fig. 3 is a vertical central section taken on the line 3—3 of Fig. 2.

The housing 24 which contains the controller structure is cylindrical and has a bottom plate 30 which forms in part a structure of the hoist. The structure of the controller comprises a ring frame member 103 suitably clamped to the rear plate 30 by suitable machine screws passing through said ring. The ring has bosses or feet for spacing the same slightly from the back plate 30 for more convenient mounting. The ring frame member 103 has posts or pillars 105, 106, 107 and 108 rising therefrom, the upper posts 106 and 107 forming a suitable mounting for the upper part of the magnet structure and for providing a pivot for the movable armature structure 101. A laminated core structure comprising two U shaped cores for the windings or coils 99 and 100 is mounted between the two clamping or mounting plates 109 and 110, the plate 109 extending out beyond the core structure to provide lugs for mounting upon the posts 105 and 108 as will be apparent from Figs. 1 and 2. Suitable U shaped laminations 111 and 112 which may be of duplicate form are clamped between said plates 109 and 110 as by means of suitable bolts or clamping screws in such a position as to face toward the common armature. Machine screws 113 and 114' pass through the upper parts of the cores and clamp the same to the posts 106 and 107. The plates 109 and 110 and their cooperating laminations 111 and 112 are notched out to form pole pieces 114 and 115 upon which the coils 100 and 99 are disposed. These coils are held in place by wire or sheet metal clips 116 which lie between the coils and the cores and have their ends bent back of the core and in front of the coil respectively to hold the parts in place.

A block of insulating material 117 is mounted between the upper ends of the plates 109 and 110 to form a suitable frame for the pivot pin 118 upon which the armature structure 101 is mounted. To avoid magnetic leakage and eddy current losses the plates 109 and 110 are separately clamped to the block of insulation 117 so that no direct low resistance or low magnetic reluctance connection between them is created. These plates 109 and 110 are preferably made of brass or other non-magnetic material. The front plate 110 is cut away about the machine screws 113 and 114 so that the screws pass through the block 117 the rear plate and into the posts 106 and 107 respectively to hold these parts together. The front plate is then secured to the block 117 by separate machine screws 119 and 120 which extend into the block 117 only and thus do not make connections between the front and back plates.

The armature structure 101 comprises a central straight core of flat laminations 121 bound together by the two side plate members 122 and 123, these plates being preferably of brass and being clamped upon the laminations by suitable clamping screws 124 which pass completely through the side plates and through the laminations. At their upper ends the side plates 122 and 123 extend up past the laminations and embrace the side plate members 109 and 110 and have holes formed therethrough in line with cooperating holes formed through said side plate members 109 and 110 and through the central core of insulating material 117 so that the pivot pin 118 forms a suitable pivot upon which the armature structure 101 may swing. The upper ends of the armature side plates 122 and 123 are cut off with substantially square shoulders which are engaged by suitable spring fingers for centering the armature structure 101 and holding it yieldingly in neutral position.

In Figures 7 and 9 I have shown the spring 125 which has a pair of spring fingers 126 formed integral with the central portion 127 for bearing against the top of the back plate 123 and a similar pair of integral spring fingers 128 bearing against the shoulders of the front plate 122. This spring structure 125 is clamped upon the top of the insulating member or block 117 by means of the machine screws 129. Now it will be seen that the spring fingers 128 and 126 tends to hold the armature structure 101 in midway position since any departure from that position tends to stress the spring. Obviously other means for holding the armature structure in neutral position may be provided without departing from the spirit of the invention but I find the above structure to be simple and highly satisfactory.

At its lower end the armature structure carries a contact mechanism 130 adapted to cooperate with stationary contacts 131, 132, 133, 134, 135, 136, 137 and 138 inclusive, which are arranged in four pairs, two pairs of which at a time are adapted to be closed by the moving contact mechanism 130. The moving contact mechanism 130 comprises two blocks or contactors 139 and 140 which are mounted upon a block of insulation 141 through the intermediary of springs 142. The block 141 is formed in the shape of a cross bar and it is secured to the lower end of the armature. The lower ends of the side plates 122 and 123 are formed in the shape of fingers 143 which pass down through suitable slots in the block or cross bar 141 and are bent towards each other to clamp the central part of the block between them, the bolts 124 holding the side plates in position.

The contact blocks 139 and 140 are employed merely as bridging blocks to bridge the contact gains above referred to. These contacts are provided with outer cylindrical surfaces for engaging the stationary contact with a partially rolling partially wiping contact as is well illustrated in Fig. 2, due to the mounting on the springs 142. In cross section these contacts, as will be apparent from Fig. 2, are shaped like the cross section of an I-beam except that the outer surfaces of the flanges are cylindrical whereas in an I-beam they are planer or flat. The spring arms 142 which are formed of helical or coil springs permit the contact to move with a pivotal motion on a very short radius due to the flexing of the spring close to the contact itself. Now in order to secure a pure rolling motion it would be necessary for the contact to roll on its own cylindrical surface and permit its center to move parallel to the surface upon which it rolls. This the contact cannot do because of the closely wound coils of the spring 142, although due to the bending of the spring there is some motion of the contact towards the block or bar 141, hence there is a slight rolling action.

In order to secure a wiping action along the cylindrical surface it is necessary that the contact have some degree of motion with respect to its own center, and this is secured by the bending of the spring 142 close to the actual geometrical center of the contact itself. The result is a self adjusting contact which engages and bridges a pair of stationary terminals with a predetermined degree of spring pressure and a certain rolling and a certain wiping action along the surface which tends to keep the contact clean. It will be observed from the illustration of Figs. 2, 3 and 10 that the contact blocks 139 and 140 are connected through central studs 144 which pass through the central web of the contact block, so that if the stationary terminal contacts are not exactly lined up with the longitudinal faces of the blocks, these blocks are free to turn through the torsional resilience of the spring 142 so that the bridging blocks 139 and 140 are free to align themselves with the stationary terminal contacts at the same time that they secure the wiping and rolling contact above explained.

The connection of the contact blocks with the insulating block or support 141 is unique and highly advantageous. The stud 144 has a head member 145 which is embraced by the end of the spring 142. This head 145 is threaded so as to fit snugly within the coils of the spring 142, the spring serving as the female threaded part for threading over the threads on the head 45. That is to say, assume that the spring has a lay or coil corresponding to the inside of a standard nut and that it threads upon the head 145. The reduced portion or the stud 144 has threads in the opposite direction so that the nut 146 which is threaded down towards the head 145 will be able to grip the end of the spring which overhangs the head 145 to bind said end by friction against the end of the head, that is the shoulder between the stud and the head, as said nut 146 is tightened up. That is to say, the tightening of the nut 146 on its thread tends to pull the end of the helical spring 142 in such a direction as to tighten the same upon the threads on the head 145. Thus the end 147 of the coil spring 142 is drawn in and contacts with the reduced portion or stud 144. This shows in exaggerated form the effect of having the threads in opposite direction and permitting the nut 146 to clamp the end of the thread. The result is that in addition to the frictional grip of the coil spring upon the threads on the head 145 the end of the spring itself is gripped between the shoulder under the head 145 and the nut 146. The contact member such as 139 is clamped between said nut 146 and a cooperating nut 148, a lock washer 149 being preferably provided to insure the grip of the nut 148 upon said contacting block 139. The upper end of the spring 142 is similarly fastened to a stud 150 which has an enlarged head 151 formed in the same manner as the head 145 so that the adjacent nut 152 may clamp the upper end of the spring between said nut and the shoulder below the head 151 as previously explained. A nut 153 and lock washer 154 mount the stud 150 upon the upper supporting block of insulation 141.

The stationary terminal contacts 131 to 134 inclusive are mounted in a supporting block of insulation 155 as shown in Figures 11 and 13, and the opposite contact pairs 135 to 138 inclusive are similarly mounted in a block of insulation 156, these blocks being mounted upon a U-shaped yoke 157 which is removably secured to the frame ring 103 as by means of the machine screws 158.

The pivot pin 118 is held in place by a spring clip 159, this spring clip being pivotally mounted upon and held by the screw 114. This spring clip rests against the end of the head of the pin 118 and has a flange extending over the top so that the spring will not become disengaged under the influence of vibration and gravity.

I shall now describe the operation of the machine as a whole.

Figure 4:
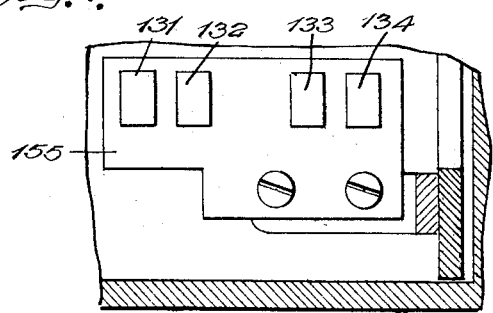
Fig. 4 is a fragmentary sectional view taken on the line 4—4 of Fig. 2 showing the switch contact in face view.

The motor 22 is of the series type and is reversible as by reversing the relation of field and armature as shown in Fig. 4. Assume that the motor is so geared to the hoisting drum and cable that closing the control circuit at the button 71 energizes the relay coil 99 pulling the armature structure 101 over to one side, closing the contacts 131 and 132 by means of the bridge piece 139 and the contacts 133—134 by means of the bridge piece 140. The result is that the motor is energized and starts to rotate, raising the load to any desired position within limits, excessive movement being prevented by the limit switch 47. Turning of the motor shaft drives the central pinion 13 which communicates motion to the idlers 12 and these in turn roll around inside of the stationary gear 31 and the movable gear 32, the difference in number of teeth between these two gears resulting in a motion of the movable gear 32.

As the drum is rotated the threaded shaft 51 is turned through the bevel gears 49 and 50 threading the button 55 towards the spring 62 and if the raising motion is not otherwise interrupted the button 55 finally moves the spring 62 away from its contact 70 opening the control circuit. The result is that the armature structure 101 is moved to its central or neutral position because of the action of the centering spring 125.

When it is desired to lower the load the button 72 is pressed to close the control circuit through the coil 100 with the result that the contact pieces 139 and 140 close the motor circuit in the reverse direction, that is with the field and armature in reverse relation to each other for rotating the motor shaft in the opposite direction.

The controller or relay construction which I have employed is of highly advantageous characteristics. It will be seen at once that the armature structure can occupy only one position at the time and consequently accidental closing of the forward and reverse contacts for the motor is impossible. The armature itself is not required to carry current except through the bridge pieces 139 and 140, consequently there is no danger of breaking off leads through repeated operation. Even if both push buttons 71 and 72 be closed at the same time, the armature structure 101 can occupy only one position and it will move to one side or the other depending upon which magnet first seizes it and close the motor circuit in the one direction. The construction of the contact and bridge pieces is highly advantageous, particularly the mounting of the bridge pieces, so as to secure a wiping and partially rolling effect with a minimum inertia of the movable parts. The bridge pieces are mounted on a substantially universal mounting through the coil springs 142 with the result that they can always accommodate themselves to the stationary contacts without difficulty. The limit switch 47 is simple and effective. After the switch opens one of the push button circuits that circuit cannot again be closed even accidentally, and the only thing that can be done is to operate the controller or relay in a direction to close the limit switch. The result is that the relay is, in connection with the other parts, substantially fool proof.

I believe that the operation of the device is sufficiently clear from the above detailed description.

I do not intend to be limited to the details shown or described.

I claim:

1. In a controller of the character described, a base member having posts rising therefrom, a magnetic structure comprising a pair of separate U-shaped cores with a pair of coils one surrounding one leg of each said cores, clamping plates for clamping said cores between them, an armature lying between said cores and being adapted to close the circuit of either core, said armature being pivoted to said clamping plates at a point between the said cores, said clamping plates being secured to said posts, stationary contacts arranged in pairs and separately secured to said base, and movable contacts connected to said armature for bridging the stationary contacts, said movable contacts being insulated from the armature.

2. In combination a pair of separate U-shaped magnetic cores, a pair of coils one encircling one leg of each said cores, clamping plates common to the two cores for clamping the cores in a position facing each other, a block of insulation lying between the upper ends of said plates, a core of magnetic material forming an armature lying between said first named cores, clamping plates for said armature core, said clamping plates extending outside of the core clamping plates adjacent said block of insulation and a pivot pin passing through the plates of the armature through the plates of the core and through said block.

3. In combination a pair of separate U-shaped cores, a pair of coils one surrounding one leg of each said cores, a pair of clamping plates for holding said cores rigidly in position with respect to each other, an armature, clamping plates for the armature, said armature lying between said cores, the plates of the armature lying outside of the plates of the cores and a pin passing through said plates to form a pivot for the armature.

4. In combination a base member, posts projecting from the base member, a pair of separate U-shaped magnetic cores, a pair of coils one surrounding one leg of each said cores, a pair of core plates holding said U-shaped cores in position to face each other, one of said core plates being fastened to the posts, said core plates being clamped together with the cores between them, an armature bar having clamping plates clamped on each side thereof, a pivot pin passing through the armature plates and through the core plates to pivot the armature for movement between the cores, and contacts controlled by the armature.

5. In combination a supporting block, an armature bar pivoted to said supporting block and having shoulders on each side of the pivot and adjacent the pivot, adapted to rise above the block upon movement of the armature to either side of a central position, an element adapted to be engaged by the said armature, a unitary spring member mounted on said block having spring fingers for engaging said shoulders for resiliently holding said armature bar in central position, and magnets for moving said armature bar to either side of such position.

6. In combination a base plate having posts projecting therefrom, a pair of magnetic cores, clamping plates for holding the cores rigidly, one of said clamping plates having ears secured to said posts, said clamping plates being clamped together upon said cores, a block of non-magnetic material clamped between said plates adjacent the upper ends of said cores, clamping screws passing through said block and through the bottom plates, an armature having clamping plates lying outside of the core plates, a pivot pin passing through the plates of the armature and the plates of the core and said block, an element adapted to be engaged by the said armature and a spring keeper for said pin mounted on one of said clamping screws.

7. In combination a frame, posts projecting therefrom, a bottom clamping plate contacting with said posts, U-shaped cores mounted on said bottom plate and a top plate on top of said cores, said plates rigidly connecting the cores together, a block of non-magnetic material lying between the plates, an armature having side plates lying outside of the core plates, a pivot pin passing through said armature plates said block and said core plates, an element adapted to be engaged by the said armature clamping screws passing through the block and through the bottom core plate and into the posts, a keeper for the pivot pin secured to one of said clamping screws and a centering spring mounted upon said block and having spring fingers engaging the ends of the armature plates for holding the armature in a central position between said cores.

8. In combination a stationary contact, a movable contact, the first contact having a flat face, the second contact having a cylindrical face, an arm for moving the movable contact and a coil spring forming an extension of said arm, said coil spring having its axis lying at substantially right angles to the line of movement of the movable contact.

9. In combination, a block of insulating material, a stud passing through said block, said stud having an enlarged head, a clamping nut on the stud, a helical spring threaded on the head and having its end clamped by said nut, and a contact having lateral contact faces secured to the opposite end of said helical spring.

10. In combination, a helical spring having its convolutions substantially in contact, studs having enlarged heads, said heads being threaded into the ends of the spring, said studs being threaded in a direction opposite to the threads upon the heads and locking nuts for clamping between them and the heads the ends of said helical spring.

11. In combination, a pair of studs having enlarged heads adjacent each other, said heads being threaded to cooperate with the end coils of a helical spring, a helical spring threaded upon said heads and having its end turn lying beyond said head at each end, the studs being threaded in a direction opposite to the threads on the heads and clamping nuts on said studs for clamping the ends of the springs against the heads.

12. A movable contact comprising a bar of I cross section, the top and bottom of the I comprising cylindrical contacting surfaces and a flexible connection to the central part of the web of the I.

In witness whereof, I hereunto subscribe my name this 6th day of September, 1924.

EARL E. McCOLLUM.